J. F. GAIL.
WELDED JOINT AND METHOD AND MEANS FOR MAKING SAME.
APPLICATION FILED MAR. 31, 1920.
1,411,340.
Patented Apr. 4, 1922.
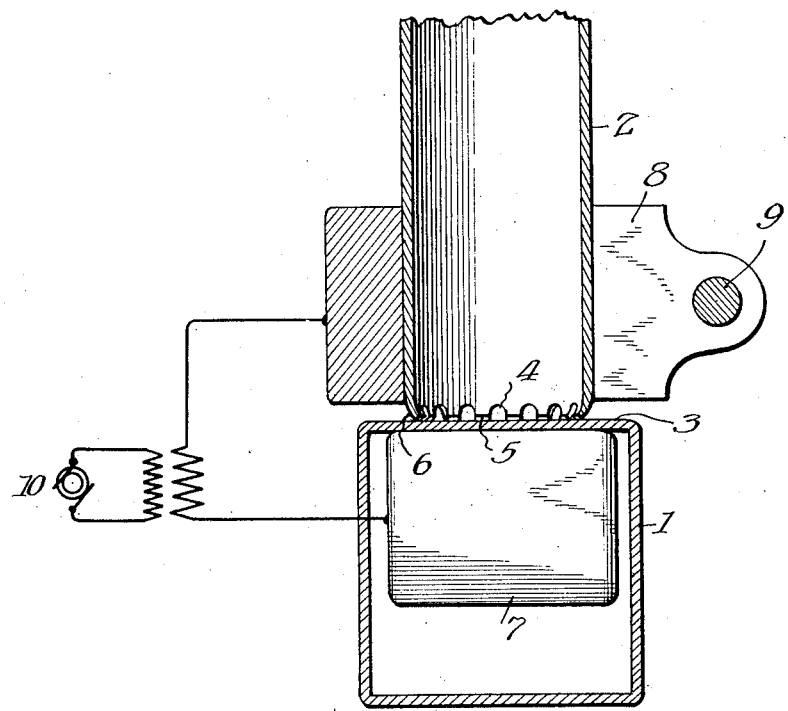
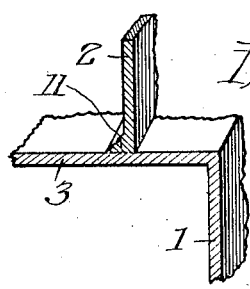
Inventor:
John F. Gail,
By Fisher, Fowle, Clapp & Soans
attys.

UNITED STATES PATENT OFFICE.

JOHN F. GAIL, OF EVANSTON, ILLINOIS, ASSIGNOR TO SIMMONS COMPANY, OF KENOSHA, WISCONSIN, A CORPORATION OF DELAWARE.

WELDED JOINT AND METHOD AND MEANS FOR MAKING SAME.

1,411,340. Specification of Letters Patent. Patented Apr. 4, 1922.

Application filed March 31, 1920. Serial No. 370,160.

*To all whom it may concern:*

Be it known that I, JOHN F. GAIL, a citizen of the United States, residing at Evanston, in the county of Cook and State of Illinois, have invented certain new and useful Improvements in Welded Joints and Methods and Means for Making Same, of which the following is a specification.

My invention has reference to the joining of a metal part edgewise to the surface of another part, and is of particular service when the edgewise part is of sheet metal as for example in metal bed and furniture construction in which tubing is employed and has the ends secured to the side of another tube or other surface.

The principal objects of my invention are to afford a welded joint of this character without leaving an unsightly burr or bead exposed to view; to increase the strength of the joint; to control the disposition of the molten metal during the operation of welding; to confine the spread of the molten metal to the side of the abutting part where it will not be exposed to view; to afford a smooth juncture of the parts at one side of the abutting part; to facilitate the fusion of the metal by decreasing the initial area of abutment; to gradually increase the area at the joint as the welding progresses; and in general to weld a thin walled part to a surface so as to afford a stronger connection and avoid the undesirable appearance at the joint heretofore resulting from the welding operation.

On the drawings—

Figure 1 shows tubular members in section arranged preparatory to being welded together, in accordance with my invention; and Fig. 2, a fragmentary perspective view, showing two parts in section joined together in accordance with my invention.

Referring to the drawings, the reference numeral 1 indicates a sheet metal tube or shell and 2, another sheet metal tube which is to be welded endwise to the wall 3 of the tube 1. Preparatory to the welding operation the end of the tube 2 is notched around the edge as at 4 so as to leave a plurality of projections 5, and the projections are bent inwardly at an angle as shown at 6 in Fig. 1 so that pressure applied to the tube 2 to force the end thereof against the wall 3 of the tube 1 would tend to spring the projections 5 inwardly. After the tube 2 has been prepared as above indicated, the welding is effected in any approved manner, as for example, by inserting a shoe 7 within the tube 1 and holding same firmly against the inside surface of the wall 3 at the point where the joint is to be made, and a clamp 8 is secured around the tube 2 by a clamping bolt 9, or in any other convenient manner, a short distance above the end of the tube 2, where the joint is to be made. The shoe 7 and clamp 8 which, as will be readily understood by those skilled in the art, must be of comparatively high conductivity, owing to the low voltage of the current employed for welding, and tightly engaged against the respective tubes 1 and 2, are connected to the opposite terminals of a source of electric energy indicated diagrammatically at 10, which furnishes current of the required welding strength.

The current having been turned on, the shoe and clamp 8 are pressed toward one another so that the projections 5 which make initial contact with the wall 3 fuse and collapse under the heat and permit the unnotched portion of the tube 2 to butt against and consolidate with the wall 3. At the same time the excess molten metal forms a corner filler 11 which spreads along the contiguous surfaces of the parts 2 and 3 and reinforces the joint.

Owing to the notched form of the end of the tube 2 the initial area of contact is much less than the cross-sectional area of the tube 2, and this reduced area of contact results in a rapid heating and fusion of the extremities of the projections 5 and the contacting portions of the wall 3, and thorough consolidation of the metal thereof at the inception of the welding operation. As the fusion of the metal continues, the pressing together of the clamp 8 and shoe 7 causes the tube 2 to follow up the collapse of the metal, and owing to the prongs or points 5 being bent inwardly the following metal tends to crowd or press the previously melted metal toward the inside of the tube so that the fused metal forms a ring or burr somewhat as indicated at 11 at the inside of the tube, which spreads inwardly over the surface 3 and upwardly along the inner surface of the wall 2 as the welding progresses. When the tube 2 has been pressed downwardly to a point where the line of fusion is at or slightly beyond the base of the notches 4, the welding current is interrupted and the fused metal allowed to cool.

The projections 5 are bent inwardly at a point adjacent the base of the notches 4 and, therefore, the excess metal will be caused to accumulate inside the tube 2, until the line of fusion reaches a point at or beyond the base of the notches where the bend begins, and as the wall of the tube 2 at this point is perpendicular to the surface 3, further pressure would tend to force the metal which is melted thereafter, to some extent to the exterior of the tube. Therefore, by turning in the metal at the lower end of the tube to the desired extent and correspondingly regulating the distance of welding, the excess molten metal may be confined to the interior of the tube and a smooth juncture of the tube 2 with the surface 3 afforded at the exterior of the tube.

The confining of the molten metal to the interior of the tube has an additional advantage, as it will spread upwardly on the inner surface of the tube 2 to a greater extent than if the surplus molten metal were distributed on the inside and the outside of the tube, and thus affords a longer "grip" on the wall of the tube 2 and a reinforcing of the tube 2 at a farther distance from the end than in previous welded joints of this character, while at the same time the area of surface of the wall 3 covered by the molten metal is substantially the same as though the molten metal were distributed on the inside and outside of the tube 2.

If desired, the edges of the projections 6 may be tapered slightly as shown in Fig. 1, thus facilitating the operation.

While I have shown and described a practical form and application of my invention, it is to be understood that I do not confine myself to the joining of tubes or the joining of parts in the particular relation or manner described but that various changes and modifications may be made without departing from the principles of my invention, the scope of which is to be determined by the appended claims.

I claim as my invention:—

1. The method of securing a tube endwise to a plate, which comprises forming the tube with a plurality of inturned projections around the end thereof, then butting said end of the tube against the face of the plate and maintaining welding current and pressing the tube and plate together until the unbroken wall of the tube seats edgewise against the surface of the plate and the projections are consolidated into a corner filler, which extends around the interior of the tube.

2. The method of securing a tube endwise to a plate, which comprises notching the end of the tube so as to form a plurality of projections around the end thereof and bending the projections inwardly substantially as shown, then butting the notched end of the tube against the face of the plate and maintaining welding current and pressing the tube and plate together until the unbroken wall of the tube seats edgewise against the surface of the plate, and the projections are merged into a corner filler, which extends around the interior of the tube and reaches outwardly from the juncture line of the tube and plate over the surfaces of both so as to unite remote portions thereof.

3. The method of securing a tube endwise to the side of another tube, which comprises notching the end of the first mentioned tube so as to form a plurality of projections at spaced intervals around the end thereof and bending said projections inwardly, substantially as shown, then butting the notched end of said tube against the side wall of the second mentioned tube, applying a support inside the second mentioned tube against the side wall thereof to which the first mentioned tube is to be connected, maintaining welding current, pressing the tubes together until the unbroken wall of the first mentioned tube seats against the wall of the second mentioned tube, and the inturned projections on the first mentioned tube are combined into a corner filler, which extends around the inside of the first mentioned tube and connects remote portions of both.

4. The method of joining a tube endwise to the side wall of another tube, which comprises notching the end of the first mentioned tube so as to form a plurality of projections around the end thereof and bending said projections inwardly substantially as shown, then applying a clamp to the first mentioned tube beyond the notches and inserting a shoe in the second mentioned tube so as to back up the wall thereof at the point where the first mentioned tube is to be joined therewith, then maintaining welding current and pressing the clamp and shoe together until the unbroken wall of the first mentioned tube seats against the wall of the second mentioned tube, and the inturned projections are combined into a corner filler, which extends around the interior of the first mentioned tube and connects portions of the walls of the tubes at a distance from the juncture line.

JOHN F. GAIL.